(12) United States Patent
Powell et al.

(10) Patent No.: US 8,714,453 B2
(45) Date of Patent: May 6, 2014

(54) MULTI-FUNCTIONAL CABLE APPARATUS FOR A BARCODE READER

(75) Inventors: George Powell, Sandy, UT (US); Garrett Russell, Phoenixville, PA (US); Frank Clegg, Fruit Heights, UT (US)

(73) Assignee: The Code Corporation, Draper, UT (US)

( * ) Notice: Subject to any disclaimer, the term of this patent is extended or adjusted under 35 U.S.C. 154(b) by 26 days.

(21) Appl. No.: 13/205,814

(22) Filed: Aug. 9, 2011

(65) Prior Publication Data

US 2013/0038985 A1   Feb. 14, 2013

(51) Int. Cl.
*G06K 7/10* (2006.01)
(52) U.S. Cl.
USPC ............ 235/462.14; 235/462.38; 235/472.01; 362/85; 362/652

(58) Field of Classification Search
USPC ............ 235/462.14, 462.38, 472.01; 362/85, 362/652
See application file for complete search history.

(56) References Cited

U.S. PATENT DOCUMENTS

| | | | | |
|---|---|---|---|---|
| 6,112,993 | A * | 9/2000 | Svetal et al. | 235/462.38 |
| 2004/0257804 | A1* | 12/2004 | Lee | 362/226 |
| 2011/0267807 | A1* | 11/2011 | Nelson et al. | 362/197 |
| 2012/0085353 | A1* | 4/2012 | Siston et al. | 128/845 |
| 2012/0274196 | A1* | 11/2012 | Arceta et al. | 312/249.11 |

* cited by examiner

*Primary Examiner* — Allyson Trail
(74) *Attorney, Agent, or Firm* — Austin Rapp & Hardman

(57) ABSTRACT

A multi-functional cable apparatus for a barcode reader supplies electrical power to the barcode reader, provides data communication capability for the barcode reader, and performs at least one additional function that is relevant to the operation of the barcode reader. The at least one additional function may include supporting the barcode reader in a fixed position without a user having to hold the barcode reader in place. Alternatively, the at least one additional function may include facilitating efficient cable management.

5 Claims, 6 Drawing Sheets

MULTI-FUNCTIONAL CABLE APPARATUS FOR A BARCODE READER

BACKGROUND

A barcode is an optical machine-readable representation of data. Originally, barcodes represented data by varying the widths and spacings of parallel lines. These types of barcodes may be referred to as linear or one-dimensional (1D) barcodes. Later, barcodes evolved into rectangles, dots, hexagons and other geometric patterns in two dimensions (2D). Although 2D systems use a variety of symbols, they are generally referred to as barcodes as well. Devices for identifying or extracting information from barcodes are generally referred to as barcode readers. Barcodes and barcode readers have become widely used in many commercial environments, such as point-of-sale stations in retail stores and supermarkets, inventory and document tracking, and the like.

DETAILED DESCRIPTION

The present invention is a multi-functional cable apparatus for a barcode reader. More specifically, the present invention is a cable apparatus that supplies electrical power to the barcode reader, provides data communication capability for the barcode reader, and performs at least one additional function that is relevant to the operation of the barcode reader. The following examples of a multi-functional cable apparatus will be described: (1) a cable stand, (2) a cable reel, and (3) a combined cable stand and reel.

Cable Stand

The first example of a multi-functional cable apparatus that will be described is a cable stand. In addition to supplying electrical power to the barcode reader and providing data communication capability for the barcode reader, the cable stand also performs the function of a stand, namely, supporting the reader in a fixed position without the user having to hold the reader in place.

Some barcode readers are capable of operating in either a "hand-held mode" or a "presentation mode." When a barcode reader is operating in hand-held mode, a user holds the reader in his/her hand, manually positions the reader so that a barcode is located within the reader's field of view, and activates a trigger located on the reader. The barcode is read in response to activation of the trigger. In contrast, when a barcode reader is operating in presentation mode, an item bearing a barcode is presented to the reader rather than the reader being presented to the barcode. In presentation mode, barcodes are read automatically when they are detected within the reader's field of view.

Figure 1:
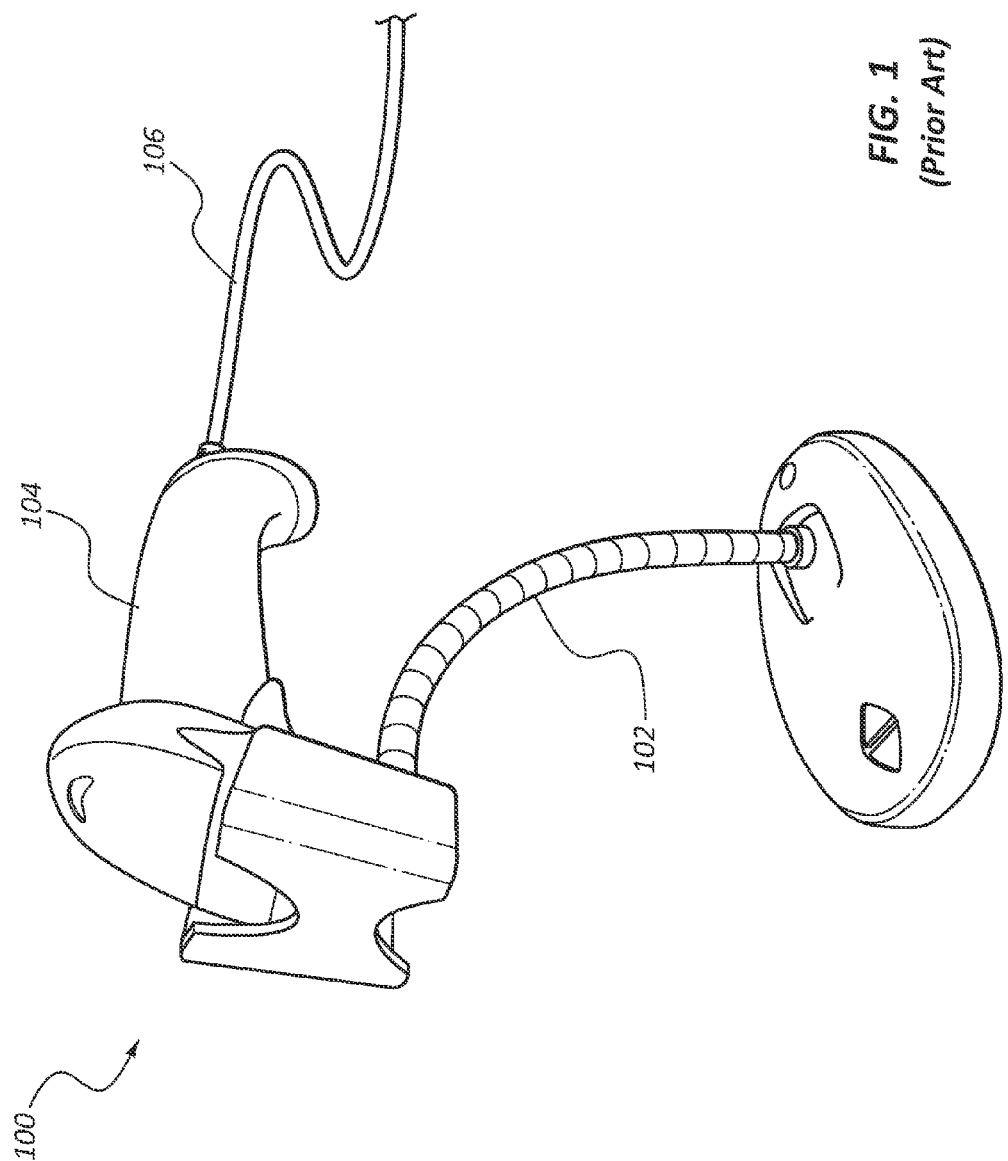
FIG. 1 illustrates an example of a stand that holds a barcode reader in a fixed position.

When a reader is operating in presentation mode, it is typically desirable for the reader to be held in a fixed position without the user having to hold the reader in place. A stand may be utilized for this purpose. FIG. 1 illustrates an example of a stand 102 that holds a barcode reader 104 in a fixed position. To read a barcode, a user positions the barcode (or, more precisely, an item bearing the barcode) within the field of view of the reader 104.

Many barcode readers, including the barcode reader 104 shown in FIG. 1, include a cable 106 that supplies electrical power to the barcode reader 104 and provides data communication capability for the barcode reader 104 (i.e., facilitates transmission of data between the barcode reader 104 and a computing device). The cable 106 may be referred to as a power/data cable 106. In the barcode reading system 100 shown in FIG. 1, the power/data cable 106 and the stand 102 are separate entities.

Figure 2:
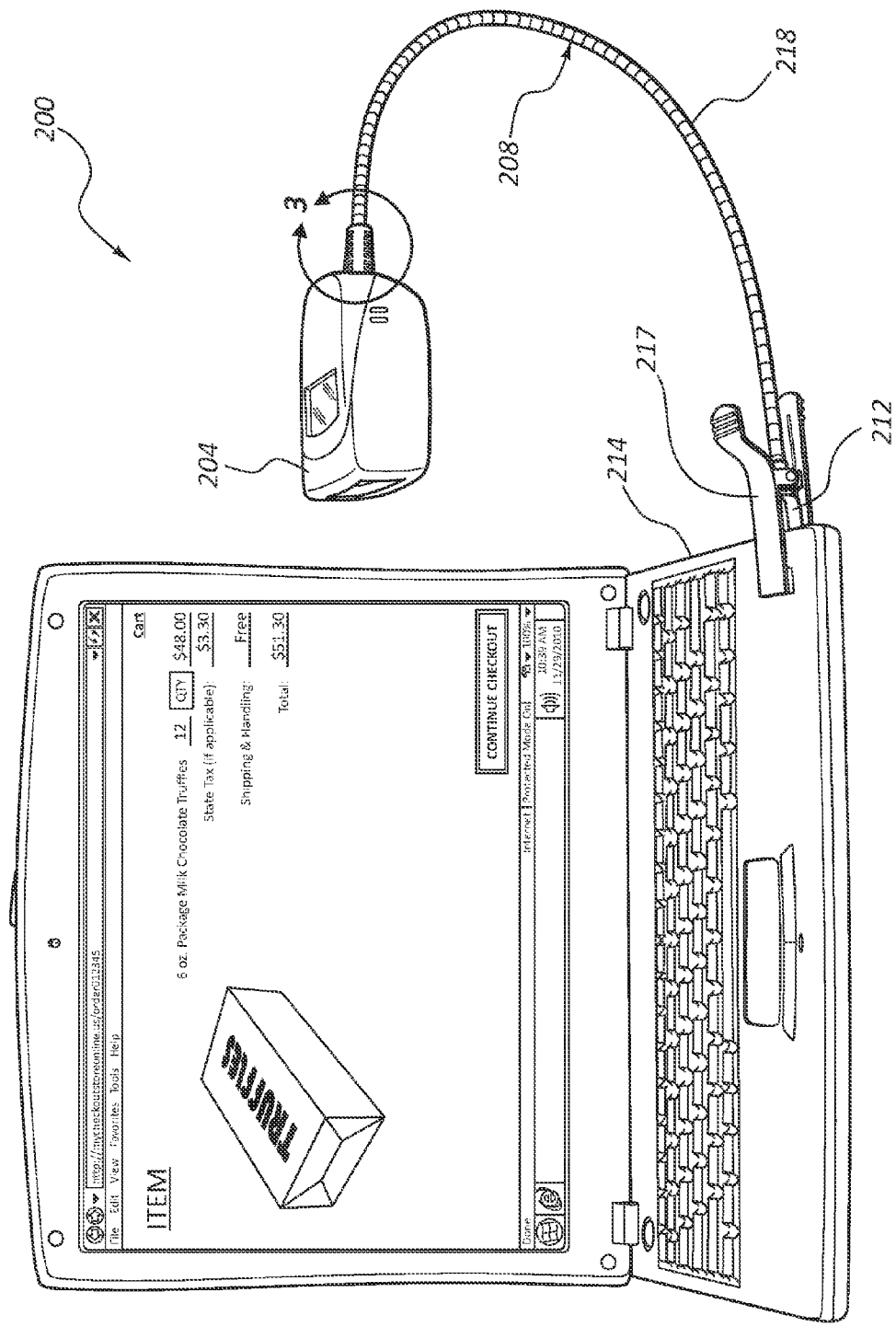
FIG. 2 illustrates a barcode reading system in which a cable and a stand for a barcode reader are combined into a single entity, which is referred to as a cable stand.

FIG. 2 illustrates a system 200 in which a cable and a stand for a barcode reader 204 are combined into a single entity, which will be referred to as a "cable stand" 208. The cable stand 208 performs the functions of the cable 106 in the barcode reading system 100 of FIG. 1, namely, supplying electrical power to the barcode reader 204 and providing data communication capability for the barcode reader 204. In addition, the cable stand 208 also performs the function of the stand 102 in the barcode reading system 100 of FIG. 1, namely supporting the reader 204 in a fixed position without the user having to hold the reader 204 in place, thereby permitting the reader 204 to be operated in presentation mode.

Figure 3:
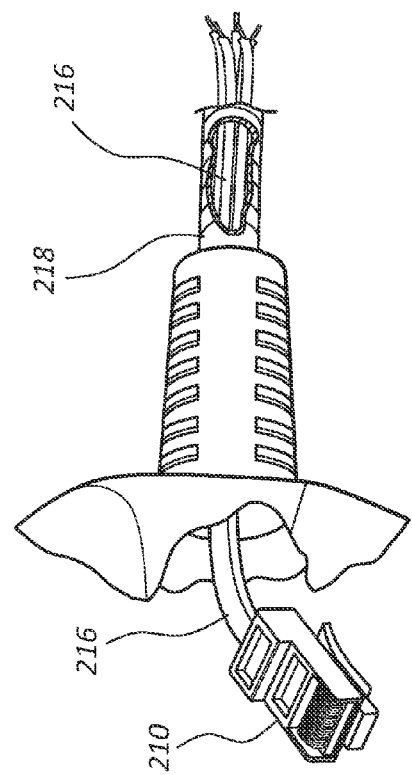
FIG. 3 is a close-up view of a portion of the cable stand of FIG. 2.

At one end, the cable stand 208 includes a first power/data interface 210 (shown in FIG. 3), which is configured to be electrically connected to a corresponding power/data interface in the barcode reader 204. At the other end, the cable stand 208 includes a second power/data interface 212, which is configured to be electrically connected to a corresponding power/data interface in a computing device 214. The first power/data interface 210 is connected to the second power/data interface 212 via a plurality of wires 216 (shown in FIG. 3). Therefore, when the first power/data interface 210 is electrically connected to the corresponding power/data interface in the barcode reader 204, and the second power/data interface 212 is electrically connected to the corresponding power/data interface in the computing device 214, then the cable stand 208 supplies electrical power to the barcode reader 204 and provides data communication capability for the barcode reader 204.

The cable stand 208 is able to support the reader 204 in a fixed position without the user having to hold the reader 204 in place because the sheath 218 for the cable stand 208 is made from flexible metal tubing (which is also sometimes referred to as flexible "gooseneck" tubing). The flexible metal tubing is sufficiently rigid so that it can support the barcode reader 204 in a fixed position. In other words, the flexible metal tubing is able to exert a large enough force in order to overcome the gravitational force of the reader 204. In addition, the flexible metal tubing is sufficiently flexible so that the reader 204 can be repositioned. Alternatively, the sheath 218 for the cable stand 208 may be made from a different material, such as plastic.

In the depicted cable stand 208, the first power/data interface 210 is an RJ50 plug (which is also sometimes referred to as a 10P10C plug), and the corresponding power/data interface in the barcode reader 204 is an RJ50 socket. Alternatively, the first power/data interface 210 of the cable stand 208 may be a universal serial bus (USB) plug, an RS-232 plug, a mini-DIN plug, exposed metal contacts, etc.

Also, in the depicted cable stand 208, the second power/data interface 212 is a USB plug, and the corresponding power/data interface in the computing device 214 is a USB socket. Alternatively, the second power/data interface 212 of the cable stand may be an Ethernet plug, an RS-232 plug, etc.

Combining the power/data cable 106 and the stand 102 in the system 100 of FIG. 1 into the cable stand 208 shown in FIG. 2 eliminates a component from the overall barcode reading system and therefore helps to keep the user's work surface free. This may be particularly advantageous for a barcode reader that is being used in a crowded environment, such as a checkout counter at a store.

As indicated above, the second power/data interface 212 (e.g., USB plug) is electrically connected to the corresponding power/data interface (e.g., USB socket) in the computing device 214. When the reader 204 is being used, it is possible that the reader 204 may be moved around to a considerable extent. It is also possible that the second power/data interface 212 will flex considerably while the reader 204 is being moved around. Because the corresponding power/data interface in the computing device 214 may be quite fragile, it is possible that the corresponding power/data interface in the computing device 214 may become damaged due to the flexing of the second power/data interface 212 when the reader 204 is being moved around. To address this problem, the depicted system 200 includes a clip 217 that attaches to the second power/data interface 212, and that rigidly holds the second power/data interface 212 to the computing device 214. This clip 217 limits the extent to which the second power/data interface 212 flexes while the reader 204 is being moved around, so that the corresponding power/data interface in the computing device 214 is less likely to become damaged.

Cable Reel

Figure 4A:
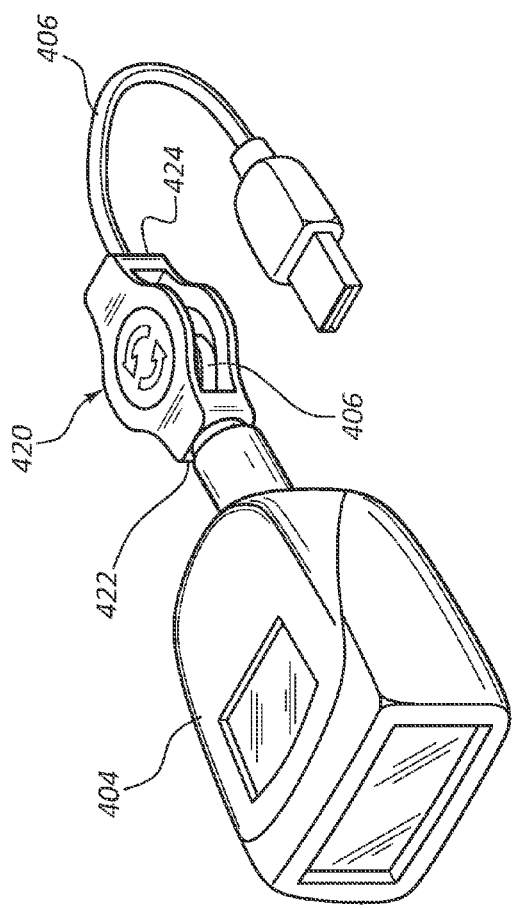
FIGS. 4A and 4B illustrate a cable reel for a barcode reader.
Figure 4B:
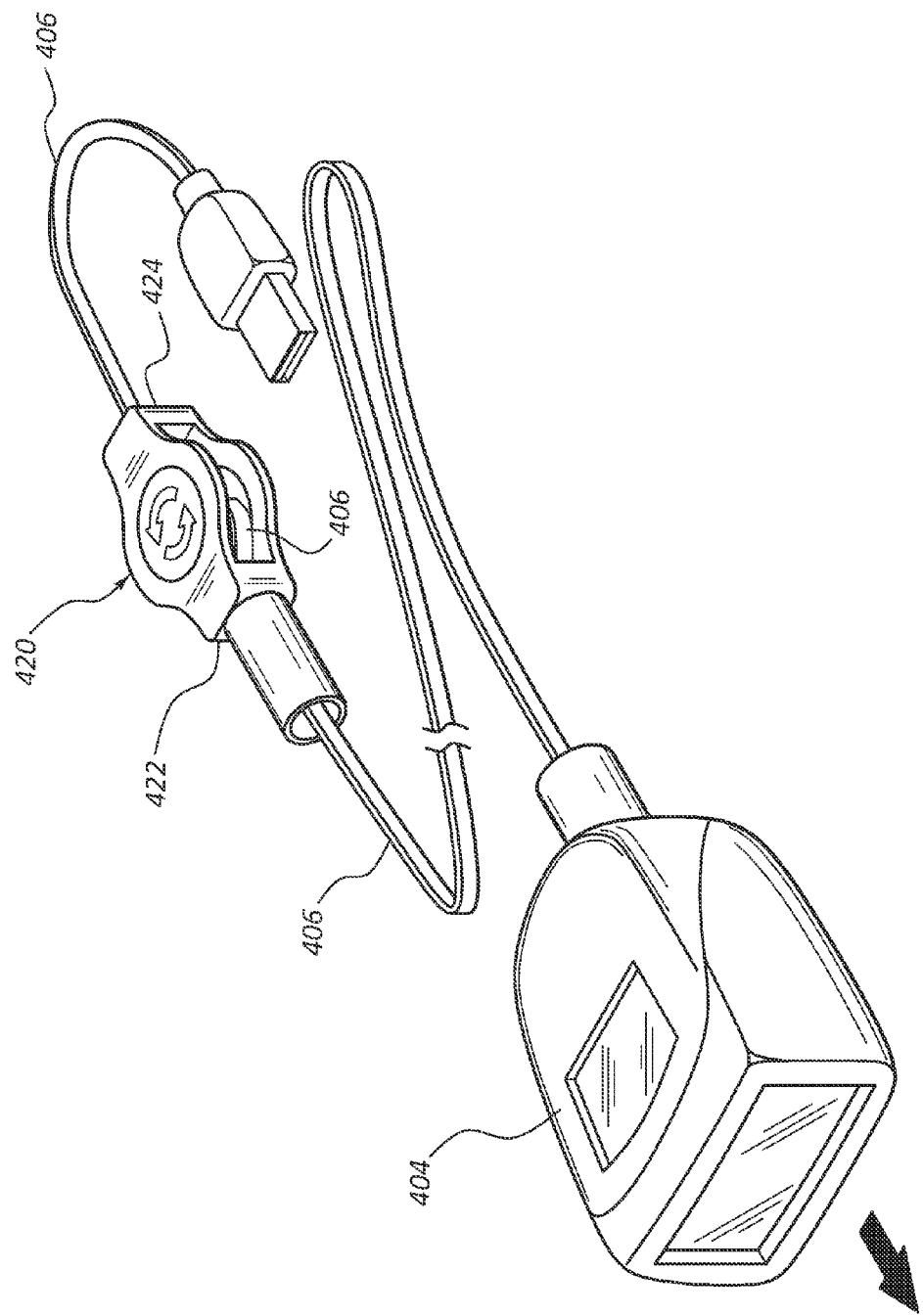

The next example of a multi-functional cable apparatus that will be described is a cable reel 420, as shown in FIGS. 4A and 4B. The cable reel 420 supplies electrical power to a barcode reader 404 and provides data communication capability for the barcode reader 404, because the cable reel 420 stores a power/data cable 406 that performs those functions for the barcode reader 404. The portion of the cable 406 that connects to the reader 404 exits one side 422 of the cable reel 420, whereas the portion of the cable 406 that connects to a computing device exits the other side 424 of the cable reel 420.

In addition, the cable reel 420 facilitates efficient cable management. When the reader 404 is not in use, almost the entire power/data cable 406 may be stored inside the cable reel 420 (as shown in FIG. 4A). However, when the reader 404 is being used, some or all of the power/data cable 406 may be pulled out from the cable reel 420 (as shown in FIG. 4B). The cable reel 420 may be configured so that the cable 406 can be pulled out from either side 422, 424 of the cable reel 420. Alternatively, the cable reel 420 may be configured so that the cable 406 can be pulled out from only one side of the cable reel 420.

The cable reel 420 facilitates efficient management of the power/data cable 406 because it eliminates the need for the user to carry the entire cable 406 when using and/or transporting the reader 404. When the reader 404 is being used, the user can pull out only the length of the cable 406 that is needed, leaving the remainder in the cable reel 420.

Combined Cable Stand and Reel

Figure 5A:
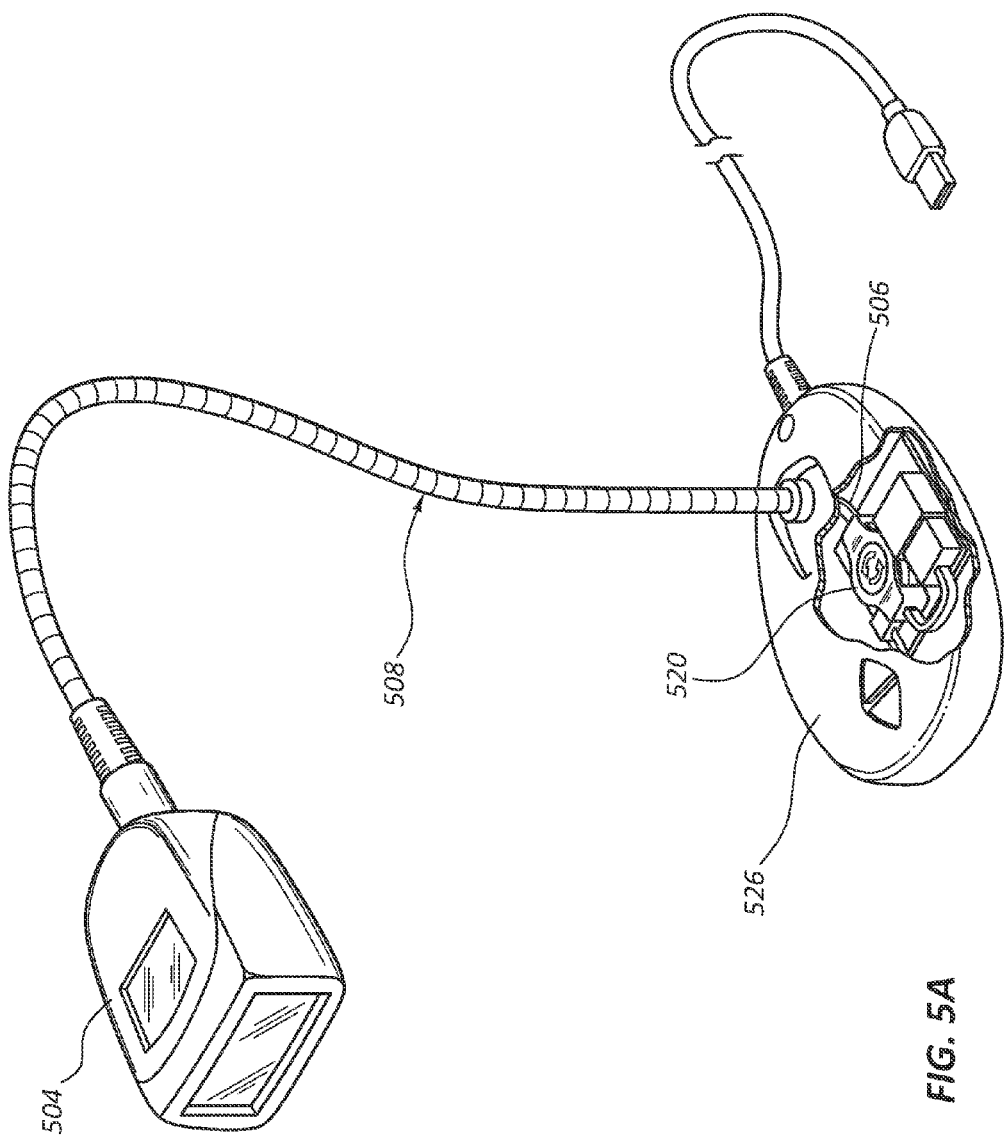
FIGS. 5A and 5B illustrate a combined cable stand and reel for a barcode reader.
Figure 5B:
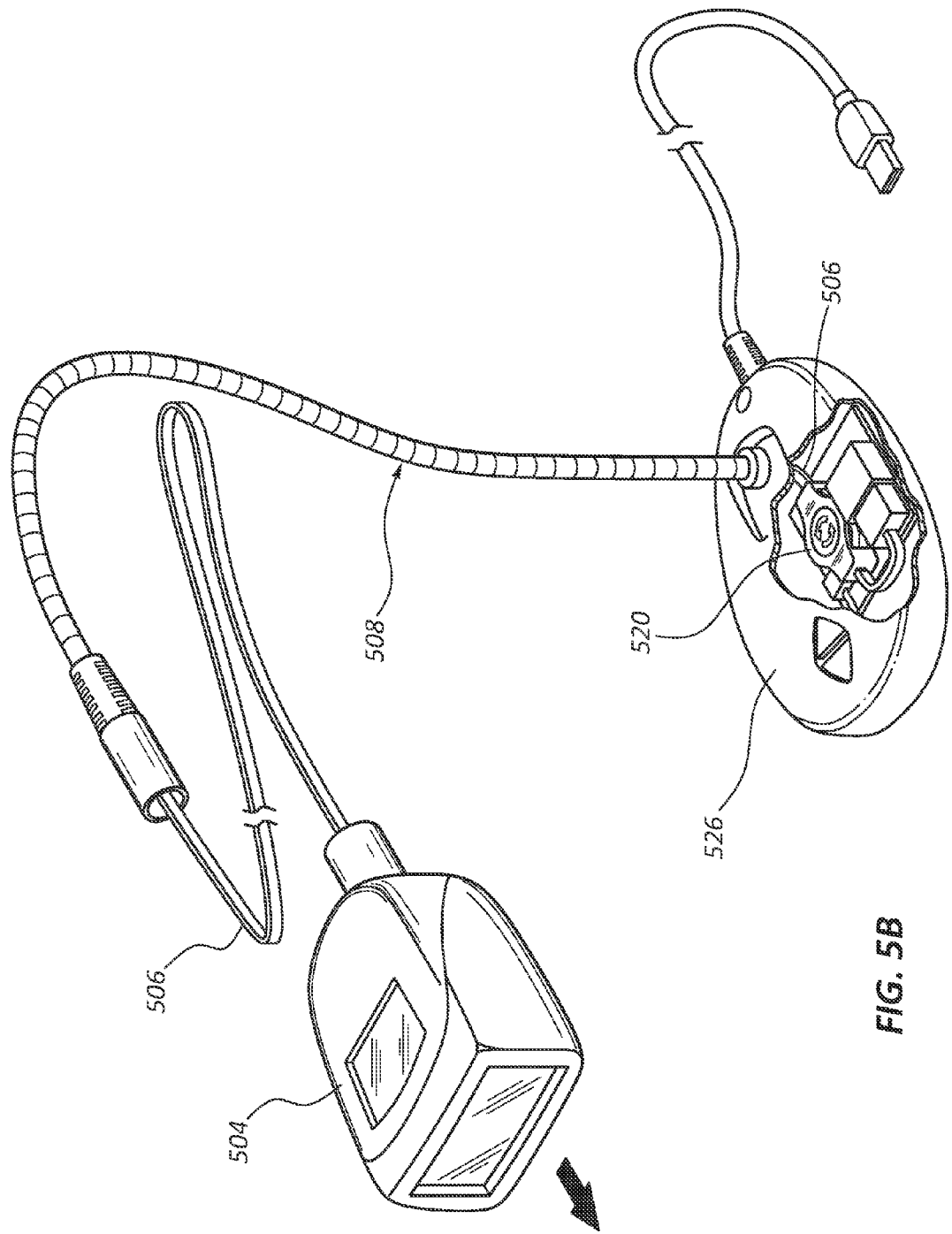

The next example of a multi-functional cable apparatus that will be described is a combined cable stand 508 and reel 520, as shown in FIGS. 5A and 5B. The combined cable stand 508 and reel 520 supplies electrical power to a barcode reader 504 and provides data communication capability for the barcode reader 504, because the combined cable stand 508 and reel 520 contains the power/data cable 506 that performs those functions for the barcode reader 504. More specifically, the power/data cable 506 for the reader 504 runs through the cable stand 508 into the reel 520, which sits inside of a base 526.

In addition, the combined cable stand 508 and reel 520 performs other functions as well. Like the cable stand 208 in the barcode reading system 200 of FIG. 2, the cable stand 508 in FIGS. 5A and 5B supports the reader 504 in a fixed position without the user having to hold the reader 504 in place, thereby permitting the reader 504 to be operated in presentation mode. The cable stand 508 may be made from flexible metal tubing that is sufficiently rigid so that it can support the barcode reader 504 in a fixed position, but sufficiently flexible so that the reader 504 can be repositioned.

The reel 520 facilitates efficient cable management, because it permits the reader 504 to be pulled out from the cable stand 508, as shown in FIG. 5B. This may be useful if, for example, the user needs to read a barcode on an item that cannot be conveniently brought into the field of view of the reader 504 (such an item on the bottom of a shopping cart). When the barcode has been read, then user may release the reader 504, which may then automatically retract to the standing position shown in FIG. 5A.

Thus, what has been described herein is a multi-functional cable apparatus that supplies electrical power to the barcode reader, provides data communication capability for the barcode reader, and performs at least one additional function that is relevant to the operation of the barcode reader. The at least one additional function may include supporting the barcode reader in a fixed position without a user having to hold the barcode reader in place. The cable stand 208 shown in FIG. 2 performs this additional function. Alternatively, the at least one additional function may include facilitating efficient cable management. The cable reel 420 shown in FIGS. 4A and 4B performs this additional function. Alternatively still, the at least one additional function may include both supporting the barcode reader in a fixed position without a user having to hold the barcode reader in place and also facilitating efficient cable management. The combined cable stand 508 and reel 520 shown in FIGS. 5A and 5B performs this additional function.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A multi-functional cable apparatus that supplies electrical power to a barcode reader, provides data communication capability for the barcode reader, and performs at least one additional function that is relevant to the operation of the barcode reader, wherein the at least one additional function comprises facilitating efficient cable management, and wherein the multi-functional cable apparatus comprises a cable reel that stores a power/data cable.

2. The multi-functional cable apparatus of claim 1, wherein a first portion of the power/data cable can be pulled out from the cable reel so that the first portion of the power/data cable is located outside of the cable reel while a second portion of the power/data cable remains inside the cable reel.

3. A multi-functional cable apparatus that supplies electrical power to a barcode reader, provides data communication capability for the barcode reader, and performs at least one additional function that is relevant to the operation of the barcode reader, wherein the at least one additional function comprises facilitating efficient cable management, and wherein the multi-functional cable apparatus comprises a combined cable stand and reel.

4. The multi-functional cable apparatus of claim 3, wherein the combined cable stand and reel comprises:
   a base;
   a reel located within the base;
   a cable stand extending upward from the base; and
   a power/data cable for the barcode reader that runs from the barcode reader, through the cable stand, and into the reel.

5. The multi-functional cable apparatus of claim 4, wherein:
   the barcode reader can be pulled out from the cable stand so that a portion of the power/data cable is located outside of the cable stand; and
   when the barcode reader is subsequently released, the barcode reader automatically retracts to the fixed position.

* * * * *